(12) United States Patent
Boettger

(10) Patent No.: US 8,682,074 B2
(45) Date of Patent: Mar. 25, 2014

(54) METHOD FOR CHECKING THE SEGMENTATION OF A STRUCTURE IN IMAGE DATA

(75) Inventor: Thomas Boettger, Heidelberg (DE)

(73) Assignee: Siemens Aktiengesellschaft, München (DE)

(*) Notice: Subject to any disclaimer, the term of this patent is extended or adjusted under 35 U.S.C. 154(b) by 293 days.

(21) Appl. No.: 13/149,870

(22) Filed: May 31, 2011

(65) Prior Publication Data

US 2012/0134552 A1    May 31, 2012

(30) Foreign Application Priority Data

Jun. 1, 2010    (DE) .......................... 10 2010 022 307

(51) Int. Cl.
*G06K 9/34*    (2006.01)

(52) U.S. Cl.
USPC .......................................................... 382/173

(58) Field of Classification Search
USPC ................... 382/173–180, 141–152
See application file for complete search history.

(56) References Cited

U.S. PATENT DOCUMENTS

| 5,048,095 | A  | * | 9/1991  | Bhanu et al. ................. | 382/173 |
| 5,737,449 | A  | * | 4/1998  | Lee .............................. | 382/242 |
| 6,650,778 | B1 | * | 11/2003 | Matsugu et al. .............. | 382/209 |
| 2005/0226506 | A1 | * | 10/2005 | Aharon et al. ................. | 382/180 |
| 2006/0147126 | A1 | * | 7/2006  | Grady .......................... | 382/274 |

OTHER PUBLICATIONS

German Office Action dated Jun. 8, 2011 for corresponding German Patent Application No. DE 10 2010 022 307.7 with English translation.

Leo Grady, "Random Walks for Image Segmentation," IEEE Transactions on Pattern Analysis and Machine Intelligence, vol. 28, No. 11, pp. 1768-1783, Nov. 2006.
Ravikanth Malladi, et al., "Shape Modeling with Front Propagation: A Level Set Approach," IEEE Transactions on Pattern Analysis and Machine Intelligence, vol. 17, No. 2, pp. 158-175, Feb. 1995.
Simon K. Warfield, et al., "Simultaneous Truth and Performance Level Estimation (STAPLE): An Algorithm for the Validation of Image Segmentation," IEEE Transactions on Medical Imaging, vol. 23, No. 7, pp. 903-921, Jul. 2004.
Leo Grady et al., "An Energy Minimization Approach to the Data Driven Editing of Presegmented Images/Volumes," Proceedings of Medical Image Computing and Computer-Assisted Intervention—MICCAI 2006, pp. 888-895, vol. II, LNCS 4191, Oct. 2006.
German Office Action dated Nov. 25, 2010 for corresponding German Patent Application No. DE 10 2010 022 307.7-53 with English translation.

* cited by examiner

*Primary Examiner* — Alex Liew
(74) *Attorney, Agent, or Firm* — Lempia Summerfield Katz LLC

(57) ABSTRACT

The present embodiments relate to a method for checking a segmentation of a structure in image data, where the segmentation to be checked provides a segmentation region that approximates the structure imaged in the image data and that is delimited by a segmentation contour. The method includes spatially resolved automatic determination of characteristic values that are suitable for serving as an indicator of the accuracy of the segmentation of the structure on the basis of the image data, the segmentation contour to be checked, or a segmentation method applied during the performance of the segmentation to be checked. The method also includes spatially resolved automatic determination of confidence values for a plurality of positions on the segmentation contour using the characteristic values determined for the corresponding positions. The confidence values may indicate the reliability of the segmentation to be checked at the corresponding positions.

20 Claims, 7 Drawing Sheets

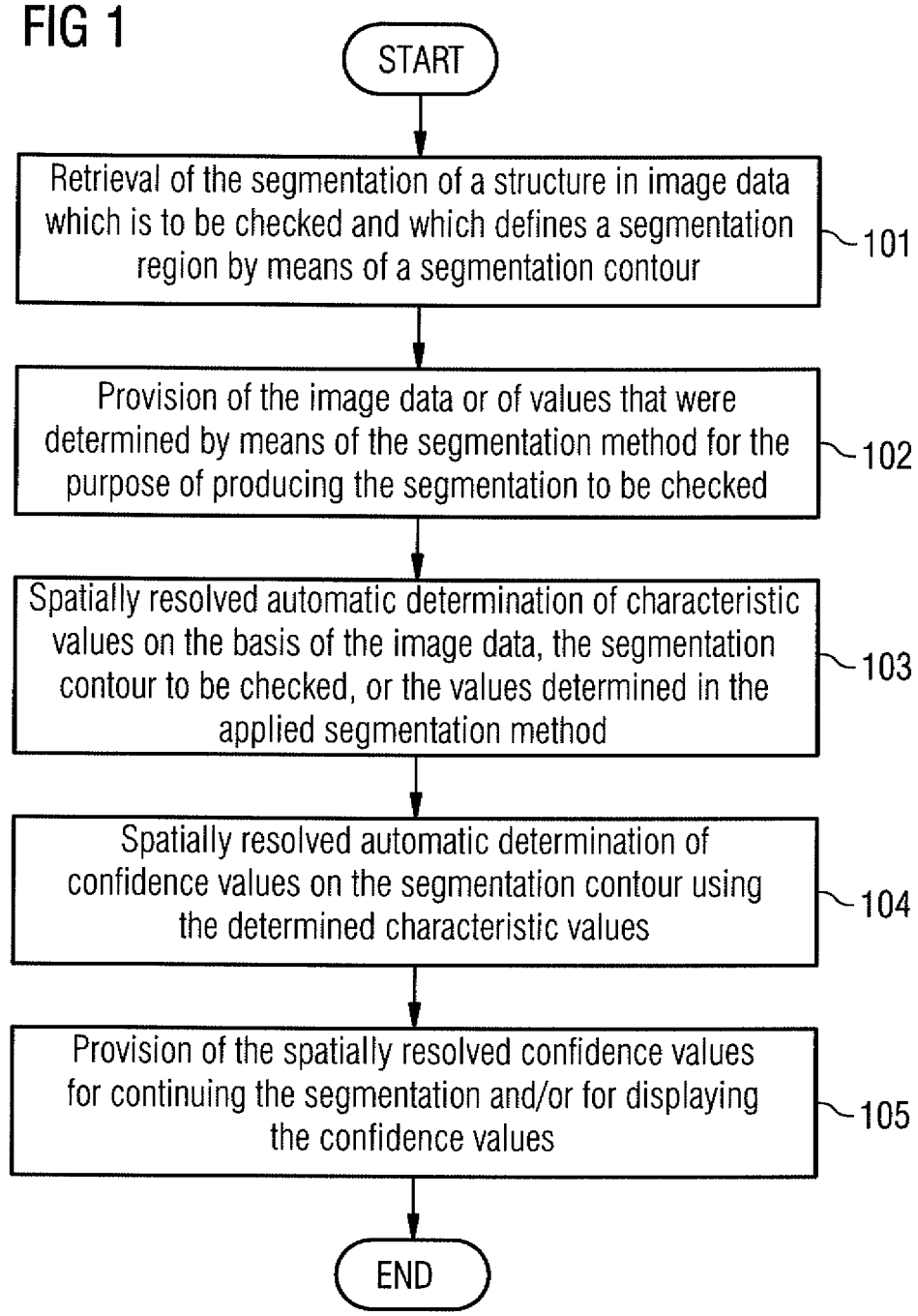

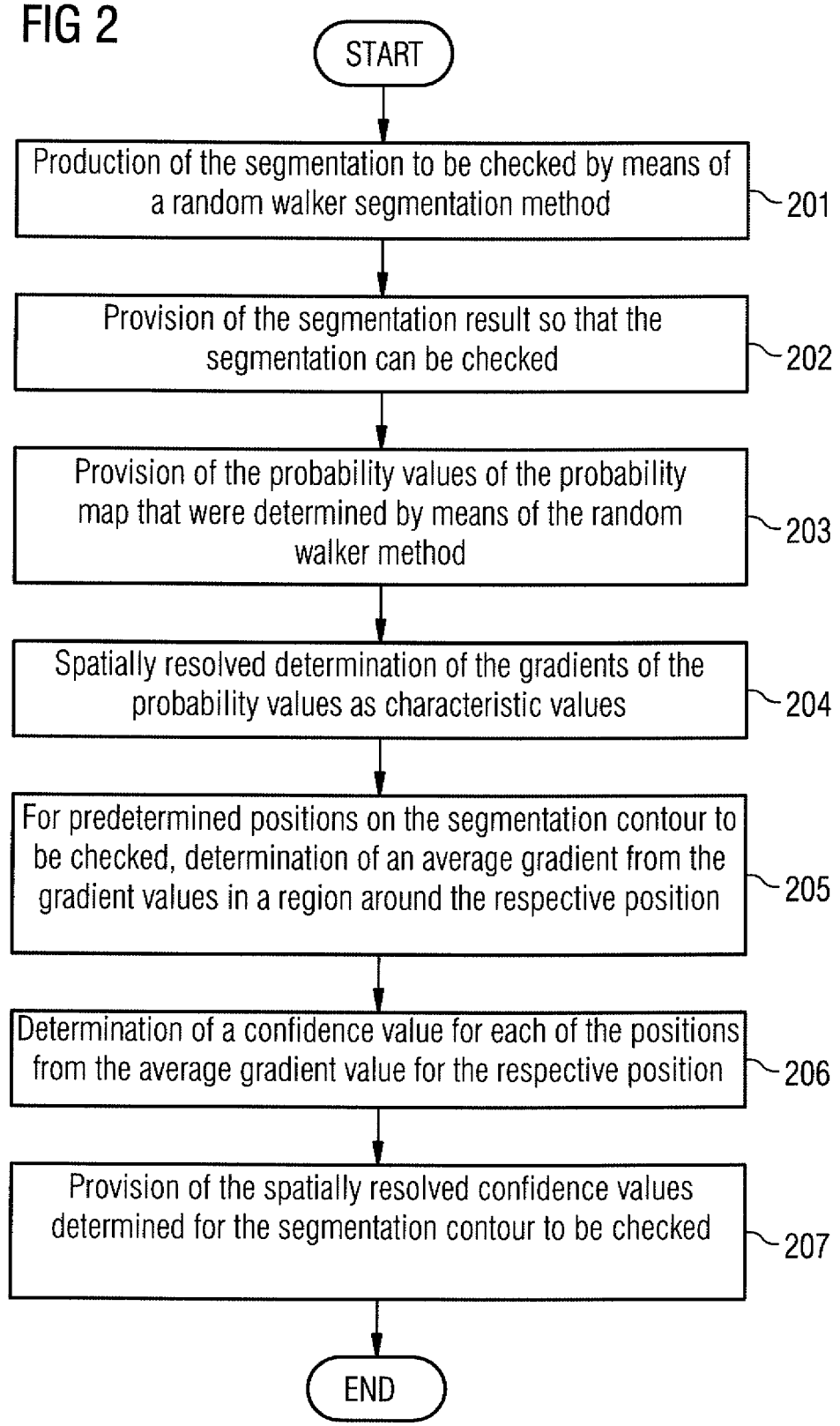

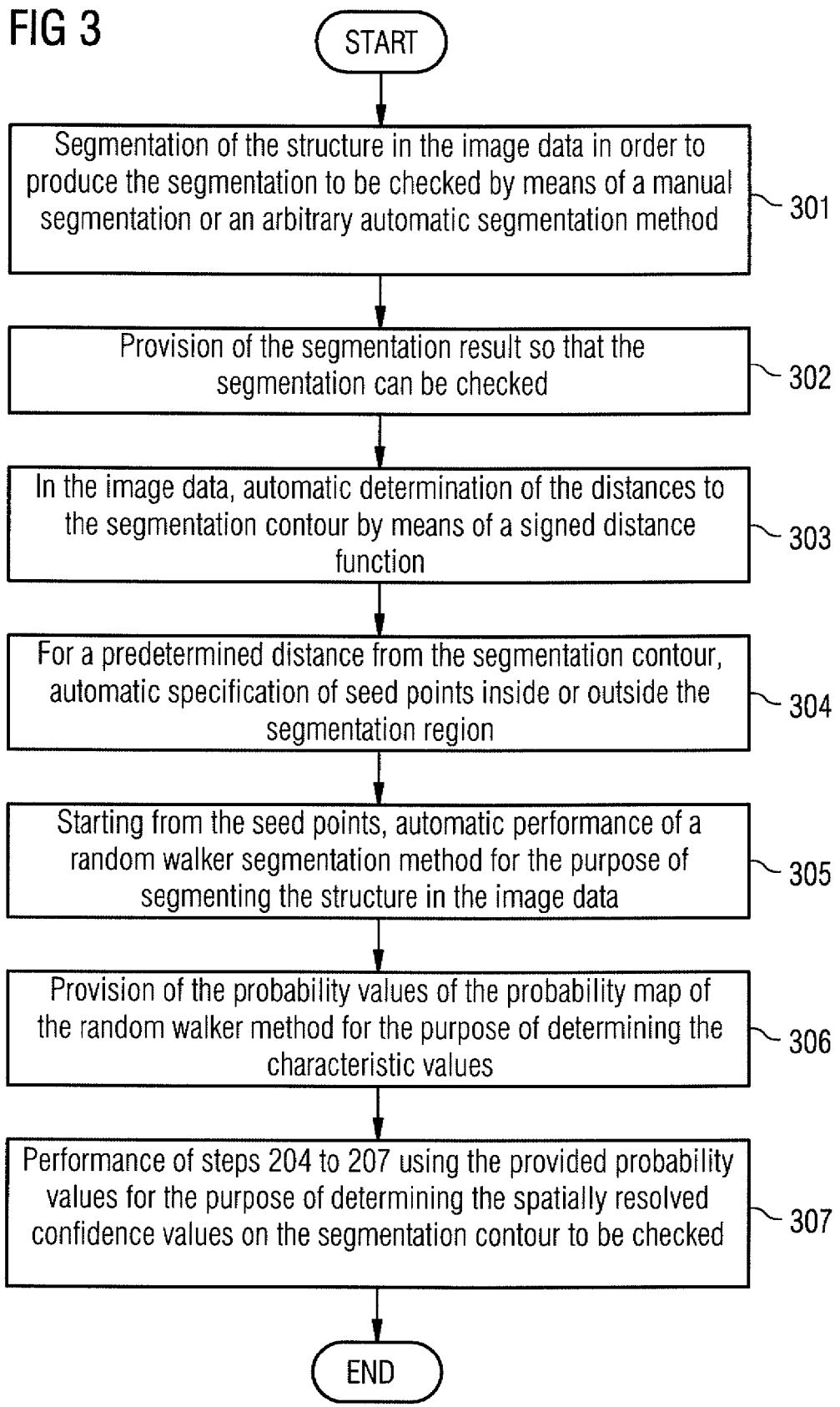

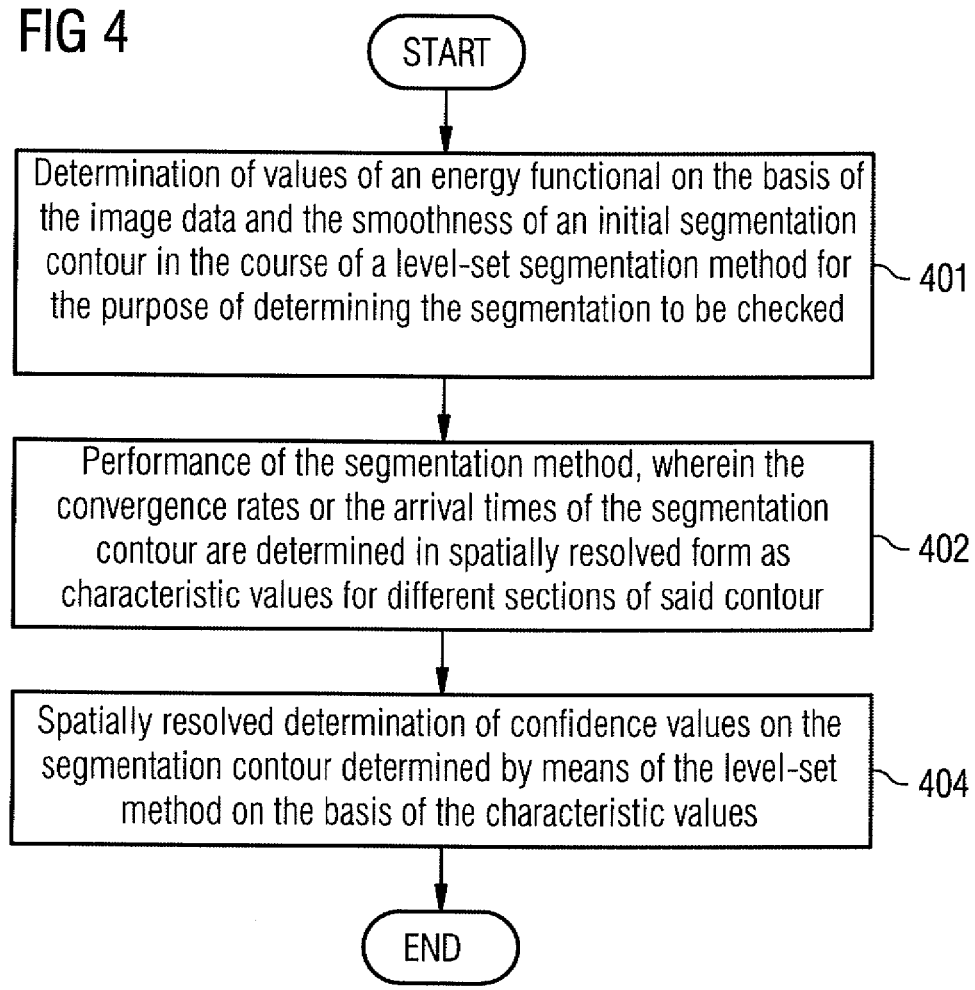
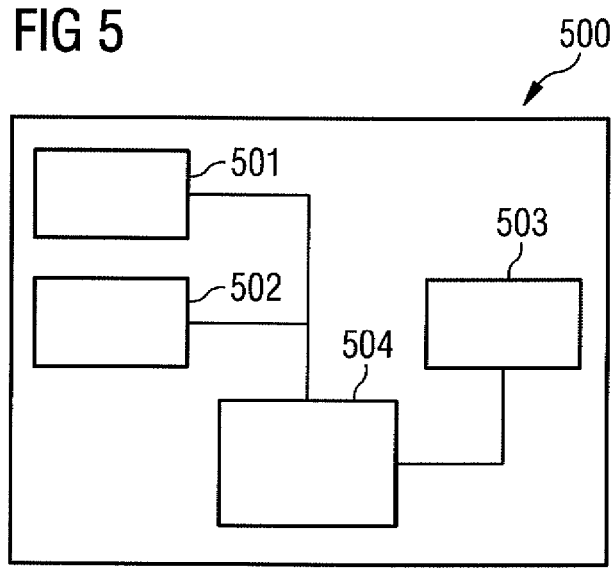

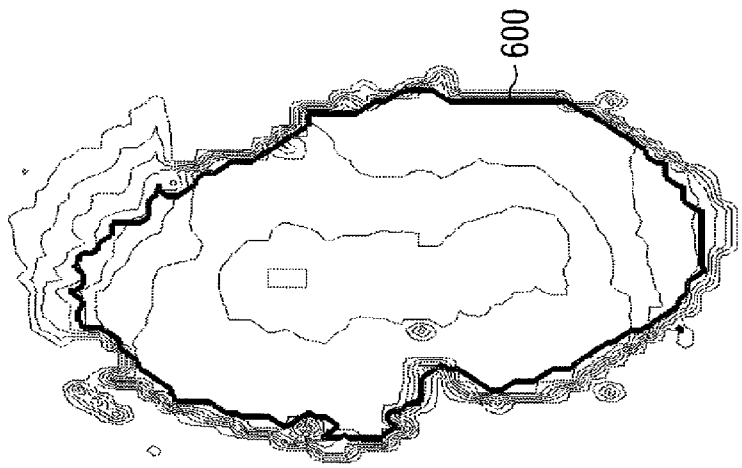
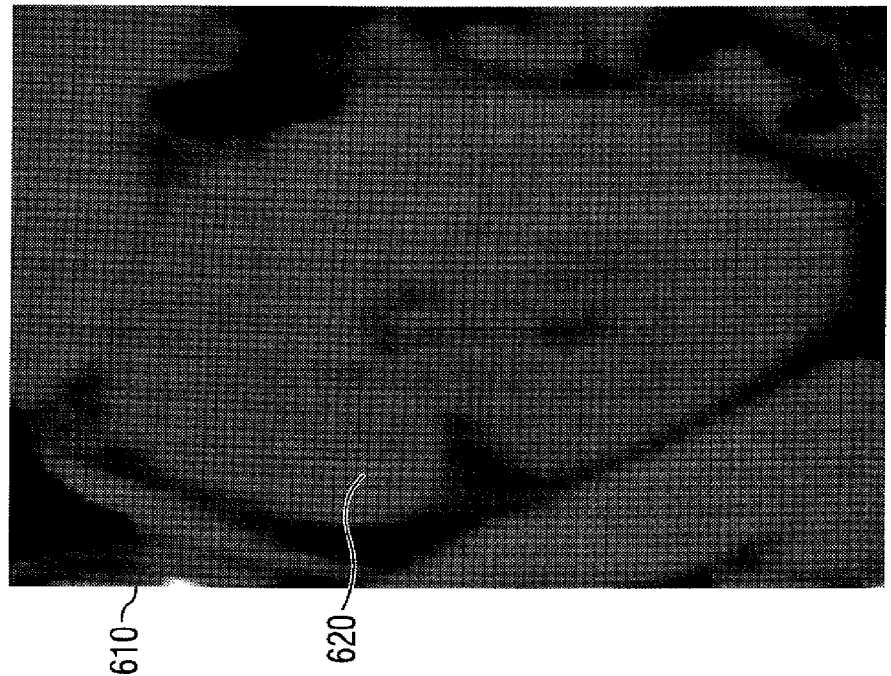
FIG 6

US 8,682,074 B2

METHOD FOR CHECKING THE SEGMENTATION OF A STRUCTURE IN IMAGE DATA

This application claims the benefit of DE 10 2010 022 307.7, filed Jun. 1, 2010.

BACKGROUND

The present embodiments relate to a method and a device for checking a segmentation of a structure in image data.

Modern medical engineering technology provides a plurality of imaging modalities, using which both 2-dimensional and 3-dimensional image data sets of examination subjects may be acquired. Whereas older methods (e.g., conventional X-ray technology) record 2-dimensional projection images, with more recent methods (e.g., computed tomography (CT) or magnetic resonance tomography (MRT)), 2-dimensional layer images as well as 3-dimensional volume data sets may be recorded and reconstructed. With technologies of this kind, structures (e.g., soft tissue) inside the body of an examination subject may be imaged at high resolution. In order to identify structures in recorded image data or for quantification purposes (e.g., quantifying the volume or a sectional area of the structure), it may be advantageous to segment the structure in the image data. In addition to manual segmentation by medical personnel, a plurality of segmentation methods that enable the segmentation to be performed semi-automatically or fully automatically are known from the prior art. These include, for example, random walker methods, active contour methods such as, for example, "snakes," or level-set methods such as "active contours without edges." These methods may also segment complex structures with a high degree of precision. Some methods are initialized, for example, by setting seed points, while others execute fully automatically.

SUMMARY AND DESCRIPTION

A problem with the cited segmentation methods is the validation of the segmentation result (e.g., a segmentation contour that surrounds the segmented region). Both in manual and in automatic segmentation of the structure, the result may be checked by medical operating personnel. The check may be no more accurate than a manual segmentation and, for example, constitutes no basis for realizing an automatic improvement in the segmentation.

Producing the finished segmentation may be an iterative process, in which erroneous contours are corrected manually on the basis of the check carried out by the user or by modifying parameters of the segmentation algorithm. This results in a high expenditure of time for performing the segmentation, determined, for example, by the time required for checking the segmentation and for carrying out the manual corrections. The suitability of automatic tools for the day-to-day medical routine is constrained thereby, since the corrections may require a similar amount of time as performing a completely manual segmentation.

A disadvantage of present-day segmentation methods is consequently the absence of an automatic determination of the accuracy and reliability of the segmentation result produced. An investment of time is necessary for manually checking or improving the accuracy. Without a check, determining the surface or position of the structure (e.g., an organ of the examination subject) using the segmentation may be inaccurate. This applies, for example, to regions, in which structures adjoin one another. The segmentation result then poorly corresponds or does not correspond to the real structure that is imaged in the image data.

The present embodiments may obviate one or more of the drawbacks or limitations in the related art. For example, the degree of accuracy in determining the contour or position of a structure using a segmentation method may be improved. In one embodiment, the time investment is kept low, and efficient checking of a segmentation result produced by the segmentation method is enabled.

According to one embodiment, a method for checking a segmentation of a structure in image data is provided, where the segmentation to be checked provides a segmentation region that approximates the structure imaged in the image data and that is delimited by a segmentation contour. The method includes the spatially resolved automatic determination of characteristic values that are suitable for serving as an indicator of the accuracy of the structure segmentation. The characteristic values may be determined on the basis of the image data, the segmentation contour to be checked, a segmentation method applied during the performance of the segmentation to be checked, or on the basis of a combination of these. The method also includes the spatially resolved automatic determination of confidence values for a plurality of positions on the segmentation contour using the characteristic values determined for the corresponding positions. Thus, the confidence values may indicate the reliability of the segmentation to be checked at the corresponding positions.

The confidence values are a measure of the probability that the segmentation contour corresponds to the surface or outline of the structure to be segmented. It may therefore be established, on the basis of the spatially resolved confidence values, in which sections of the segmentation contour the segmentation was accomplished with a high degree of accuracy. Regions with low confidence values may be identified, and a manual or automatic adjustment of the segmentation contour may be performed in the sections. Sections with low confidence values may, for example, be displayed to a user so that a correction may be made, or the segmentation algorithm may be modified for the region and continued. Thus, an improvement in the accuracy of the segmentation may be achieved as a result of the spatially resolved determination of the confidence values. Since the spatially resolved confidence values may be determined fully automatically, a considerable time saving may be achieved when the segmentation is performed. Determining the contour and position of a structure (e.g., an organ of an examination subject that is imaged in image data) may therefore be performed more accurately and in a shorter time. For example, the segmentation contour may correspond to the boundary of a segmentation marker or label, or the segmentation contour may be defined explicitly (e.g., using an implicit or explicit function or a set of pixels that lie on the segmentation contour).

A plurality of different types of characteristic values may be used in the method in order to determine the spatially resolved confidence values for the segmentation contour to be checked. Thus, for different sections of the segmentation contour, the probability that the segmentation contour in the corresponding section corresponds to the actual outline or the actual surface of the imaged structure may be assessed. A quality metric for the segmentation that allows a local modification and improvement of the segmentation is provided.

In one embodiment, the spatially resolved characteristic values determined on the basis of the image data include one or a combination of the following types of values: gradients of intensity values in the image data, in which the structure is imaged; gradients of probability values of a probability map determined using a random walker segmentation method during a segmentation of the structure in the image data within the scope of the checking method; and/or curvature values of probability isocontour lines in the probability map.

Meaningful confidence values may be determined on the basis of the characteristic values. High gradients of intensity values, for example, are a sign of clearly defined edges of the structure and for a reliable segmentation in these regions. The same applies to the gradients of the probability values. In the case of a random walker method, these may be the probabilities, with which a random walker, starting from the corresponding image position, reaches seed points inside or outside the segmentation region. A large gradient of the probability points to a clearly defined edge and to a reliable segmentation. Large curvature values of the isocontour lines (e.g., a wide variation in the curvature values for different isovalues) may indicate image noise and consequently, a lower reliability of the segmentation in the corresponding region.

The spatially resolved characteristic values determined on the basis of the segmentation contour to be checked may include curvature values of the segmentation contour to be checked. For example, curves of the segmentation contour are not included in the production of the segmentation using the random walker segmentation method, although the curves may assume certain values for a specific organ to be segmented, for example. The segmentation result may be checked on the basis of the curvature values, and on the basis thereof, spatially resolved confidence values may be determined for different sections of the segmentation contour.

The spatially resolved characteristic values determined on the basis of the applied segmentation method may include one or a combination of the following types of values: gradients of probability values of a probability map determined using a random walker segmentation method applied during the performance of the segmentation to be checked; curvature values of probability isocontour lines in the probability map; convergence rates for different sections of the segmentation contour to be checked that occur during the performance of the segmentation using the segmentation method; changes in values of an energy function determined using the segmentation method with variations in the segmentation contour.

In one embodiment, the characteristic values may be based, for example, on values determined during the production of the segmentation to be checked. The values may be provided by the segmentation method for the purpose of the check. The checking method may also be performed partly in parallel with the actual segmentation so that the characteristic values may be determined during the segmentation. The convergence rates occurring during a level-set segmentation, for example, may be included as characteristic values (e.g., by generation of a time-of-arrival map). A faster convergence in a section of the segmentation contour (or an earlier time of arrival) points to a reliable segmentation in the corresponding section. Similarly, a marked change in values of an energy function determined, for example, in an active-contours method, with variations in the segmentation contour, points to a strong edge and consequently, to a reliable segmentation in the section. The cited value types are suitable for determining meaningful confidence values.

In one embodiment, the confidence value for a position may be determined by statistical analysis of the characteristic values that are arranged in a specific region around the position. The statistical analysis may be performed, for example, by determining a simple or weighted average value or a median of the characteristic values in the specific region. Thus, characteristic values that are adjacent to the respective position on the segmentation contour may be taken into account. A Gaussian function may be used for weighting the characteristic values in the averaging, such that more closely adjacent values are assigned a greater weight than characteristic values having a greater distance from the segmentation contour. In this way, reliable and meaningful confidence values may be determined even when the image data is affected by noise.

The confidence values may be determined such that higher characteristic values lead to higher confidence values. For example, higher gradients of image intensities or probability values and higher convergence rates point to a higher accuracy of the segmentation in the corresponding regions, with the result that higher confidence values are determined for these. Other characteristic values such as, for example, curvature values of the segmentation contour may also be determined such that higher characteristic values lead to lower confidence values. Other operations may be performed during the determination of the confidence values (e.g., a weighting of the values or a normalization of the values or similar) so that meaningful confidence values are obtained for the respective application scenario.

Depending on the applied segmentation method, the segmentation contour may be described in different ways (e.g., as an implicit function in a level-set method or as a segmentation mask with the resolution of the image data in a random walker method). In one embodiment, the segmentation contour in the image data is described by the positions of pixels or voxels that lie on the segmentation contour or are intersected by the segmentation contour, a confidence value being determined for each pixel or each voxel of the segmentation contour. If the segmentation contour is provided in a functional representation or in a resolution other than that of the image data, a discretization of the segmentation contour may be performed in the resolution of the image data. Alternatively, characteristic values determined on the basis of the image data may also be transformed into the reference system of the segmentation contour.

The segmentation to be checked may be a manual segmentation performed by user input, or the segmentation to be checked may have been produced automatically or semi-automatically using any arbitrary segmentation method. In one embodiment, the method includes performing a random walker segmentation method for segmenting the structure in the image data in order to determine probability values for the image data. In other words, an additional segmentation is performed using the random walker method separately from the segmentation to be checked. The spatially resolved characteristic values are obtained by determining gradients of the probability values. The spatially resolved characteristic values are therefore determined on the basis of the image data, while further characteristic values may be incorporated into the determination of the confidence values. Confidence values may be reliably and automatically determined even for a segmentation that is to be checked manually.

The seed points for this random walker segmentation method may be determined on the basis of the segmentation to be checked. For example, a signed distance function that indicates the distances to the segmentation contour of the segmentation to be checked is determined automatically. The seed points may be predefined automatically inside and outside the segmentation region for a predefined distance to the segmentation contour. The random walker segmentation method may be performed automatically using the predefined seed points. The spatially resolved characteristic values may be determined by gradient formation from the probability values obtained in the process, and from the spatially resolved characteristic values, corresponding confidence values may be derived. Thus, even in a manual segmentation, confidence values for the segmentation contour may be determined fully automatically.

In another embodiment, the segmentation to be checked is produced using a random walker segmentation method, with which probability values for the image data are determined. The spatially resolved determination of the characteristic values takes place on the basis of the segmentation method by determining gradients of the probability values. The probability values, in the form of a probability map, for example, may be provided together with the segmentation contour. The checking method may therefore refer to already present values and consequently, may be performed quickly and with little overhead.

In one embodiment, the segmentation to be checked is produced using a random walker segmentation method. In this case, the spatially resolved characteristic values are determined by determining the curvature of the segmentation contour to be checked. The random walker segmentation result may be reliably assessed by offsetting with the curvature values of the segmentation contour.

The confidence values may also be determined on the basis of a combination of characteristic values, such as the probability gradients and the curvature values of the present embodiments.

Starting from the segmentation to be checked, the segmentation of the structure in the image data may be continued using the determined confidence values. This may be accomplished, for example, by automatic modification of a parameter of the segmentation method used to produce the segmentation to be checked, on the basis of the determined confidence values, and by a new determination of the segmentation using the modified segmentation method. If the segmentation to be checked is produced, for example, using a random walker segmentation method, the threshold value for a binary extraction of the segmentation region from the probability map may be adjusted locally on the basis of the confidence values. In this way, the segmentation region may be determined with higher accuracy.

An automatic improvement in the segmentation may be realized based on the confidence values. The confidence values for the segmentation contour may also be displayed in spatially resolved form. A user may correct the segmentation contour manually in regions with low confidence values, for example. By displaying the confidence values, for example, using color coding on the segmentation contour, the user's attention may be directed in a targeted manner to regions, in which the segmentation has a low reliability, and there is a higher probability of a correction of the contour being necessary. A time saving may be achieved by focusing the correction on the corresponding regions.

In one embodiment, the method is performed fully automatically by a computer unit.

According to another embodiment, a device for checking the segmentation of a structure in image data is provided. The segmentation to be checked provides a segmentation region that approximates the structure imaged in the image data and that is delimited by a segmentation contour. The device includes a computer unit that is configured for performing the following acts: spatially resolved automatic determination of characteristic values that are suitable for serving as an indicator of the accuracy of the segmentation of the structure on the basis of the image data, the segmentation contour to be checked, a segmentation method applied in the performance of the segmentation to be checked, or a combination of these; and spatially resolved automatic determination of confidence values for a plurality of positions on the segmentation contour using the characteristic values determined for the corresponding positions, the confidence values indicating the reliability of the segmentation to be checked at the corresponding positions.

Similar advantages to those described above with reference to the method of the present embodiments may also be achieved by the device according to the present embodiments.

In one embodiment of the device, the computer unit is configured for performing one of the above-described methods.

A further embodiment relates to a non-transitory electronically readable data medium, on which is stored electronically readable control information that is configured such that the electronically readable control information performs one of the above-described methods when the data medium is used in a computer system. In one embodiment, a computer program product including a computer program that performs one of the above-described methods when executed in a computer system is provided.

BRIEF DESCRIPTION OF THE DRAWINGS

FIG. 1 shows a flowchart of one embodiment of a method for checking a segmentation of a structure in image data;

FIG. 2 shows a flowchart of one embodiment of a method for checking a segmentation of a structure in image data;

FIG. 3 shows a flowchart of one embodiment of a method for checking a segmentation of a structure in image data;

FIG. 4 shows a flowchart of one embodiment of a method for checking a segmentation of a structure in image data;

FIG. 5 shows a schematic block diagram of one embodiment of a device for checking a segmentation of a structure in image data;

FIGS. 6A and 6B show image data that images a kidney and isocontour lines of probability values determined using a random walker segmentation method during the segmentation of the kidney in the image data;

DETAILED DESCRIPTION OF THE DRAWINGS

Figure 7:
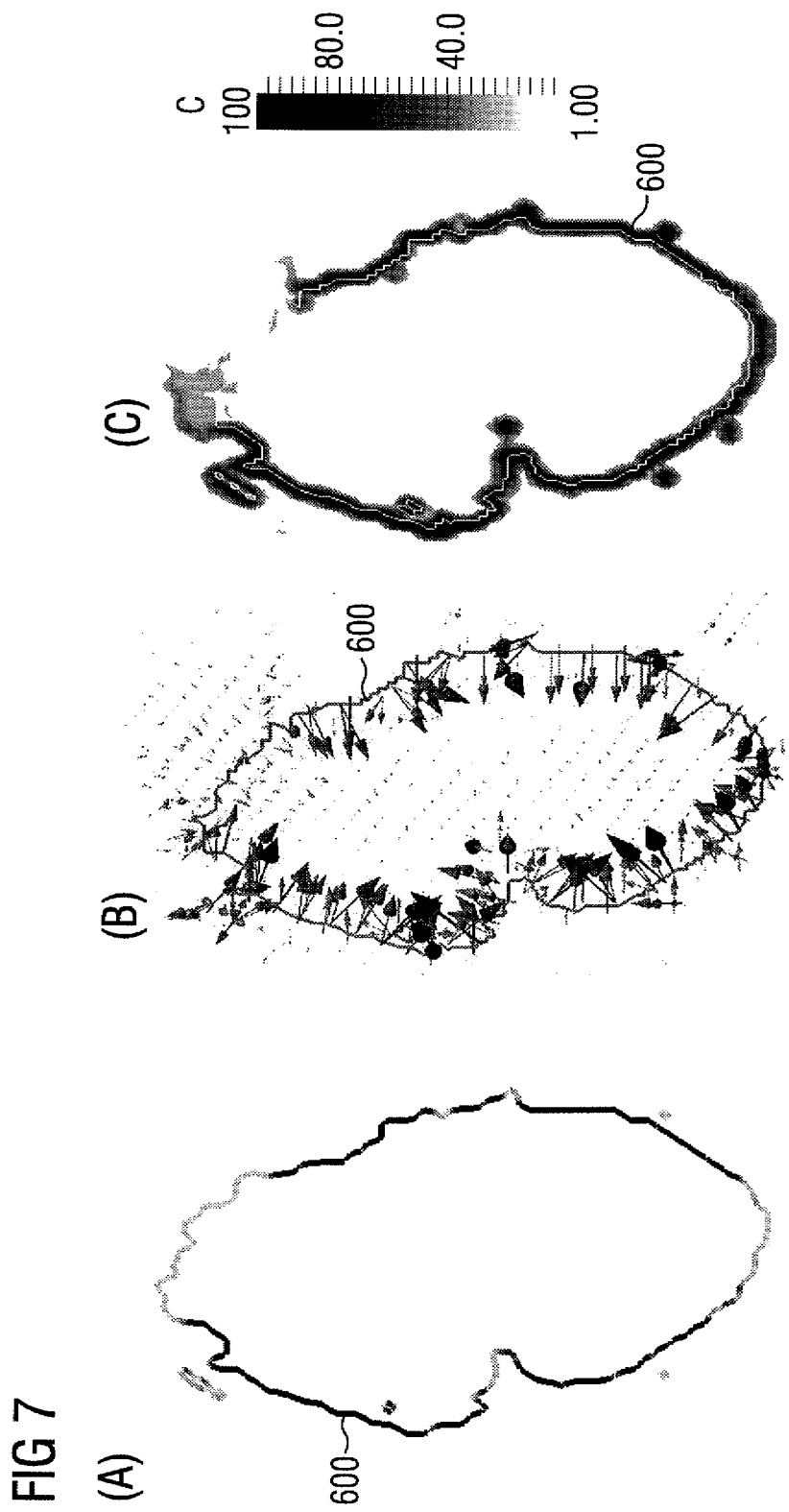
FIG. 7A shows probability values on a segmentation contour determined using the random walker segmentation method during the segmentation of the kidney.
FIG. 7B shows absolute values and vectors of gradients of the probability values determined on the segmentation contour of FIG. 7A.
FIG. 7C shows confidence values determined based on the probability gradients of FIG. 7B for a plurality of positions on the segmentation contour.

Segmentation may be the generation of regions that are related in terms of content. The segmentation may be used, for example, in the medical domain for determining the size or position of structures (e.g., organs) in image data acquired from an examination subject or patient. In the segmentation of a structure, image data pixels of the structure, for example, are assigned to the segmentation region in order to determine the segmentation region, or a contour is placed manually or automatically around the structure in the image data in order to enclose the segmentation region. This may be done in each case both in a 2-dimensional layer image or slice and in a 3-dimensional image data set. In the first-cited case, the segmentation contour is a line, and in the second-cited case, the segmentation contour is a surface.

The segmentation contour may describe an outline or a surface of the actual structure in an optimum manner so that changes in the structure due, for example, to growth of a tumor on an organ or properties of the structure (e.g., the volume of the liver or kidney) may be determined with maximum precision. The present embodiments permit the segmentation contour to be validated based on the segmentation result and the image data, the validation being performed automatically and not requiring further inputs.

FIG. 1 shows a flowchart of one embodiment of a method for checking a segmentation of a structure in image data. In act 101, the segmentation of a structure in image data that is to be checked and defines a segmentation region using a segmentation contour is retrieved. This may take place by reading in a segmentation mask from a memory, for example, or by transferring a segmentation result of a segmentation method performed in a preliminary stage. Thus, the segmentation may also have been performed manually by tracing outlines of the structure on the screen, and the segmentation data stored in the process is retrieved in act 101. The segmentation may be 2-dimensional or 3-dimensional.

The confidence values may be estimated based on properties of the segmentation contour such as curvature values thereof, for example. In other embodiments (e.g., as shown in FIG. 1), the image data is provided in act 102, or alternatively, values determined using the segmentation method are provided for producing the segmentation to be checked in order to use certain properties of the segmentation as a basis for determining the confidence values. Values determined using the segmentation method may include, for example, probability values of a random walker algorithm, as described in detail below, convergence rate values, and/or energy function values. The segmentation accuracy depends on the values determined using the segmentation method, and the values determined using the segmentation method affect, for example, the convergence rate of an automatic segmentation method.

In act 103, a spatially resolved automatic determination of characteristic values takes place on the basis of the provided image data, the segmentation contour to be checked or the values determined in the applied segmentation method. In an image data-based determination of the characteristic values, the characteristic values may be, for example, gradients of the image intensities. The gradients of the image intensities may be determined in a region around the segmentation contour to be checked and may be of different order. Image data may also be further processed initially, for example, through application of an automatic segmentation method, as described in more detail below with reference to FIG. 3. Characteristic values that are based on the segmentation contour may be curvature values of the segmentation contour (e.g., if the curvature of the segmentation contour is not taken into account in the segmentation to be checked). The segmentation contour to be checked may have, in certain regions, strong curvatures that may not be expected in the regions in the structure that is to be segmented (e.g., an organ such as in the segmentation of kidney, liver and heart). If the segmentation contour has strong curvatures, this is indicative of the lack of accuracy of the segmentation in the region.

The segmentation method for producing the segmentation to be checked may already calculate different values that may be drawn upon as a basis for determining the characteristic values. Thus, in an automatic random walker segmentation, a probability map is determined, from which the spatially resolved characteristic values may be obtained by calculating gradients, as described in closer detail with reference to FIG. 2.

In act 104, the spatially resolved automatic determination of confidence values on the segmentation contour takes place using the determined characteristic values. Positions or sections on the segmentation contour may be selected. The confidence values are determined for the positions or sections on the segmentation contour. The segmentation contour may be present in various forms. For example, the retrieved segmentation may include a mask, in which an area belonging to the segmentation region is marked by a determined bit value. The boundary of the area is the segmentation contour. In one embodiment, a confidence value is determined for each pixel or voxel on the boundary. In this way, a spatial resolution that corresponds to the resolution of the segmentation mask may be achieved.

In other methods such as a level-set segmentation method, the segmentation contour is obtained as an implicit function. A discretization of the segmentation contour may be performed by determining the image data pixels or voxels that are intersected by the segmentation contour. A confidence value may be determined for each of the pixels located on the contour.

The numeric determination of the confidence values is dependent on the characteristic values used. If gradients of the image intensities or of a probability map are used as characteristic values, the gradients may be normalized, for example, by a maximum gradient value that corresponds to a confidence value of C=100% (maximum confidence). The confidence value is a measure of the probability that the segmentation contour at the corresponding point corresponds to the actual outline or the actual surface of the structure imaged in the image data. For example, in a gradient-based determination of the characteristic values, the confidence values are calculated such that high confidence values are obtained for large gradients. Large gradients may define sharp edges, which may allow a very accurate and reliable segmentation both manually and automatically. With small gradients, the edge of the structure may be detected and determined automatically with difficulty, with the result that a low confidence value is also determined for a low gradient value.

The inverse may be the case when curvature values of the segmentation contour or curvature values of isocontour lines of a probability map are used, since high curvature values may be indicative of an inaccurate segmentation. Analogously, higher confidence values are determined for lower curvature values.

When determining the confidence values, a weighting may, for example, be applied logarithmically or using empirical values, as well as to perform a further recalculation of the characteristic values in order to obtain optimally meaningful confidence values. A suitable calculation method is selected as a function of the characteristic values used.

The confidence values may also be determined on the basis of multiple different types of characteristic values. Thus, for example, both the curvature values of the segmentation contour and the values of image intensity gradients or probability gradients may be incorporated into the determination of the confidence values. A suitable choice of the characteristic values to be used may be made on the basis of the segmentation method used and of the segmented structure.

In act 105, the spatially resolved confidence values are provided for continuing the segmentation and/or for displaying the confidence values. An automatic global or local refinement of the segmentation result may be carried out using the confidence values (e.g., the segmentation method is repeated using modified parameters). If the random walker segmentation method is used, a threshold value for the binary extraction of the segmentation region may be adapted locally, for example. The edge weights for the random walker method may also be adjusted locally.

Confidence statistics may be displayed to the clinical user. In this way, support may be provided for a review and approval process for treatment planning. The display of the confidence values, as illustrated by way of example in FIGS. 7C and 8, may also support the manual correction of the segmentation contour, since the user may immediately establish in which regions the segmentation contour is inaccurate or has been determined with low confidence.

FIG. 2 is a flowchart of another embodiment of a method for checking a segmentation of a structure in image data, in which the characteristic values are ascertained on the basis of the segmentation method used for producing the segmentation to be checked. The segmentation to be checked is produced in act 201 using a random walker segmentation method. In the random walker segmentation method, the image data is transferred into a graph, in which voxels of the image data correspond to nodes, neighboring voxels being connected by edges. The edges are assigned a weight that is determined from grayscale values of the voxels connected to the edges. For segmentation purposes, individual voxels (e.g., individual nodes of the graph) are defined as seed points. This may be done by manually labeling the pixels on a screen. Two different types of seed points are determined inside and outside the structure to be segmented. The remaining unlabeled nodes are each assigned to the one or other seed points by "random walkers." The random walker may reach a neighbor node with a probability corresponding to the edge probability. For the two different types of seed points, a probability that each type of seed point is reached from a node is determined. This is repeated for each node (e.g., for each voxel or pixel). A probability map is thus calculated with a probability for each pixel. In an ensuing binary extraction, each pixel is assigned to the type of seed point that the pixel has the greatest probability of reaching. Thus, given a threshold value of the extraction of 50%, a pixel, for which the probability of reaching a seed point lying within the structure is above 50%, for example, is assigned to the segmentation region belonging to the structure.

A random walker segmentation method that may also be used with the method presented here is described in detail in the publication Leo Grady, "Random Walks for Image Segmentation," IEEE Trans. on Pattern Analysis and Machine Intelligence, Vol. 28, No. 11, pp. 1768-1783, November. 2006.

In this way, a cohesive segmentation region may be determined automatically in a simple manner with only the setting of necessary seed points. The segmentation result produced is provided in act 202 so that the segmentation, in the form of the binary segmentation mask, for example, may be checked.

In act 203, the cited probability values of the probability map determined using the segmentation method are provided. In act 204, gradients of the probability values are determined as characteristic values in spatially resolved form. In regions, in which pixels may be clearly assigned to one structure or another, the random walker algorithm determines correspondingly high probability values for the assignment to the respective structure. The large gradient of the probability values present in the region points to the high accuracy of the segmentation in the region. Gradients of the probability values are therefore suitable as an indicator of the accuracy of the segmentation.

This may be illustrated, for example, with reference to FIGS. 6A and 6B. FIG. 6A shows a detail of a coronal layer image from a 3-dimensional image data set of the abdominal region of an examination subject, the left kidney of the examination subject being represented in the image data 610 as a structure 620. An edge structure between the kidney and the pancreas is weakly defined. An inaccurate segmentation is to be expected in this case. FIG. 6B shows probability isocontour lines in the probability map determined using the random walker segmentation method for the image data 610 shown in FIG. 6A. The 50% probability isocontour shown in black corresponds to the segmentation contour 600 for the kidney in the slice image. As shown with reference to the isocontour lines fanning out in the top right-hand section of FIG. 6B, the probabilities there have a small gradient in comparison with other sections of the segmentation contour 600. The weakly embodied edge in the image data may be identified with the aid of the low gradient, and a lower segmentation confidence may be estimated for this region.

The probability values do not represent a good indicator of the accuracy of the segmentation along the segmentation contour 600, as illustrated in FIG. 7A. FIG. 7A shows the probability values of the random walker probability map on the segmentation contour 600. The probabilities have similar values in the top and bottom sections of the contour. However, as can be seen with the aid of the contrast in the image data of FIG. 6A and the isocontours of the probabilities in FIG. 6B, the contour in the bottom part may be determined more accurately than in the top part. For the same segmentation contour 600, FIG. 7B shows the gradient sizes and gradient directions as vectors. Based on a comparison with FIG. 6A, it is recognizable that the probability gradients have higher values in regions having strongly pronounced edges than in regions having weakly defined edges. By determining the size of the gradients, inferences about the accuracy of the segmentation may be made. The gradient values constitute suitable characteristic values.

In order to calculate the confidence values, an average gradient is determined in act 205 of FIG. 2 from the gradient values in a region around predetermined positions on the segmentation contour to be checked. For example, gradient values along a line standing vertically on the segmentation contour 600 at the respective position are averaged, or gradient values from a circular region around the respective position on the segmentation contour are averaged. Since high gradients may occur between immediately adjacent pixels due to image noise, such averaging increases the reliability of the confidence value determination. Other statistical methods, such as the forming of a median or similar, may be used.

In act 206, a confidence value is determined from the average gradient values for the respective position on the segmentation contour. In this case, the confidence values may be determined as described previously with reference to FIG. 1; the confidence values may be determined, for example, for each voxel on the segmentation contour 600.

FIG. 7C shows the spatially resolved confidence values determined on the same segmentation contour 600 based on the gradient values shown in FIG. 7B. A light or dark representation of the segmentation contour 600 denotes a low or high confidence c, respectively. In considering the confidence values in the bottom part and the top part of the segmentation contour, it may be established that the top part, in which the kidney touches the pancreas, is clearly characterized by lower confidence values, while the rest of the segmentation contour has average and high confidence values. Using the method according to the present embodiments, regions having high and low reliability of the segmentation may be differentiated from one another automatically. The segmentation in the top part of the segmentation contour 600 may automatically be improved, for example, by adapting and repeating the segmentation method, or by adjusting the probability threshold value in the binary extraction.

In act 207, the spatially resolved confidence values determined for the segmentation contour 600 to be checked are provided for this purpose. The confidence values may be displayed, as described with reference to act 105 of FIG. 1, or the segmentation may be continued. A selective display enables a manual correction of the segmentation in this region to take place without increased expenditure of time.

Whereas in the case of the exemplary embodiment of FIG. 2, the segmentation to be checked was produced using the random walker method, in the embodiment shown in FIG. 3, any arbitrary segmentation method, including a manual segmentation of the structure, may be used. With the method illustrated in FIG. 3, the segmentation of the structure in the image data for producing the segmentation to be checked is performed using a manual segmentation or an arbitrary automatic segmentation method in act 301. The segmentation result is provided in act 302 so that the segmentation may be checked. The previously described probability values are generated for the image data using a random walker method that uses automatically determined seed points on the basis of the contour to be checked.

In act 303, distances of pixels in the image data from the segmentation contour are automatically determined using a signed distance function. The person skilled in the art is familiar with determining distances in such a way, so this subject will not be explored in further detail here. In act 304, seed points are automatically specified inside and outside the segmentation region for a predetermined distance from the segmentation contour. This may be accomplished fully automatically, since the segmentation result to be checked and consequently a segmentation region are already present. In act 305, the random walker segmentation method is performed starting from the seed points for the purpose of automatically segmenting the structure in the image data. A second segmentation that is essentially independent of the segmentation to be checked is therefore performed in order to determine a probability map for the image data.

In act 306, the probability values of the probability map of the random walker method are provided for determining the characteristic values. The image data, the segmentation contour to be checked and the probability map are therefore available for determining the confidence values.

In act 307, acts 204 to 207 of FIG. 2 are performed for the purpose of determining the spatially resolved confidence values. The spatially resolved confidence values are determined on the segmentation contour to be checked and not on the contour that was obtained in the course of the checking method using the additional random walker segmentation method. This serves for providing the probability values. Thus, the confidence values illustrated in FIG. 7C may also be determined for a manually drawn contour.

The method may also be performed without the use of a random walker algorithm. Such an embodiment of the method is explained below with reference to the flowchart of FIG. 4. With the method, the structure in the image data is segmented using a level-set method, in the course of which the values of an energy function that is determined on the basis of the image data and the smoothness of a segmentation contour are minimized (act 401). Within the scope of the iterative method, an initial segmentation contour is modified or evolved so that the initial segmentation contour aligns with the edges of the structure to be segmented in the image data.

The segmentation method is performed in act 402, the segmentation contour being evolved over a number of iterations. The convergence rates or the arrival times (time-of-arrival map) of the segmentation contour in the segmentation result are determined as characteristic values in spatially resolved form for different sections (e.g., at different positions of the segmentation contour). Thus, there are regions of the segmentation contour that reach the corresponding position of the final segmentation result after a few iterations, while the segmentation contour converges much more slowly in other sections and has a correspondingly late "arrival time." The convergence rate or arrival time is therefore a good indicator of the accuracy of the segmentation in the corresponding sections.

In act 404, the spatially resolved determination of confidence values on the segmentation contour determined using the level-set method is performed on the basis of the convergence rates or arrival times. Higher convergence rates or shorter arrival times lead to higher confidence values. In other respects, the confidence values may be determined as described previously with reference to FIG. 1.

A level-set segmentation method that may be used in the case of the exemplary embodiment of FIG. 4 is described, for example, in Ravikanth Malladi, James A. Sethian, and Baba C. Vemuri, "Shape Modeling with Front Propagation: A Level Set Approach," IEEE Transactions on Pattern Analysis and Machine Intelligence, Vol. 17, No. 2, pp. 158-175, February 1995. For details in relation to the segmentation method, reference is expressly made to this publication.

The features of the embodiments described above may be combined. Thus, for example, gradients of image intensities, curvature values of the segmentation contour to be checked and/or curvature values of probability isocontours may be included in the determination of the confidence values in the different embodiments. The probability isocontour lines shown in FIG. 6B have relatively small curvatures over the lower and middle part of the segmentation contour. In the top part of the image, in which the outlines of kidney and pancreas may be identified with difficulty, the isocontour lines fan out strongly for different isovalues. This is associated with high curvature values for the isocontour lines at the boundary of the region, and, for example, also with a high degree of variation of the curvature values for different isovalues. This is a further indicator of only a low accuracy of the segmentation in this region, which may be taken into account in determining the confidence values for this region.

FIG. 5 schematically shows one embodiment of a device 500 for checking a segmentation of a structure in image data. The device 500 includes a computer unit 504 that is configured for performing one of the above-described methods. The computer unit 504 is connected to a memory 503, in which the image data and the segmentation contour to be checked are stored. The computer unit 504 may retrieve the image data and the segmentation contour from the memory 503 and store the determined confidence values using the memory 503. The preceding segmentation of the structure of the image data may be performed manually by displaying the image data on display 501 while a user traces the contour using input unit 502, each of the hardware units communicating with the computer unit 504. The segmentation may also be performed automatically by the computer unit 504 as described above. The computer unit 504 may continue the segmentation automatically on the basis of the confidence values. The confidence values may also be displayed on the display 501, and the user may perform a manual correction of the segmentation using the input unit 502. The device 500 may be implemented as a computer system, for example.

Figure 8:
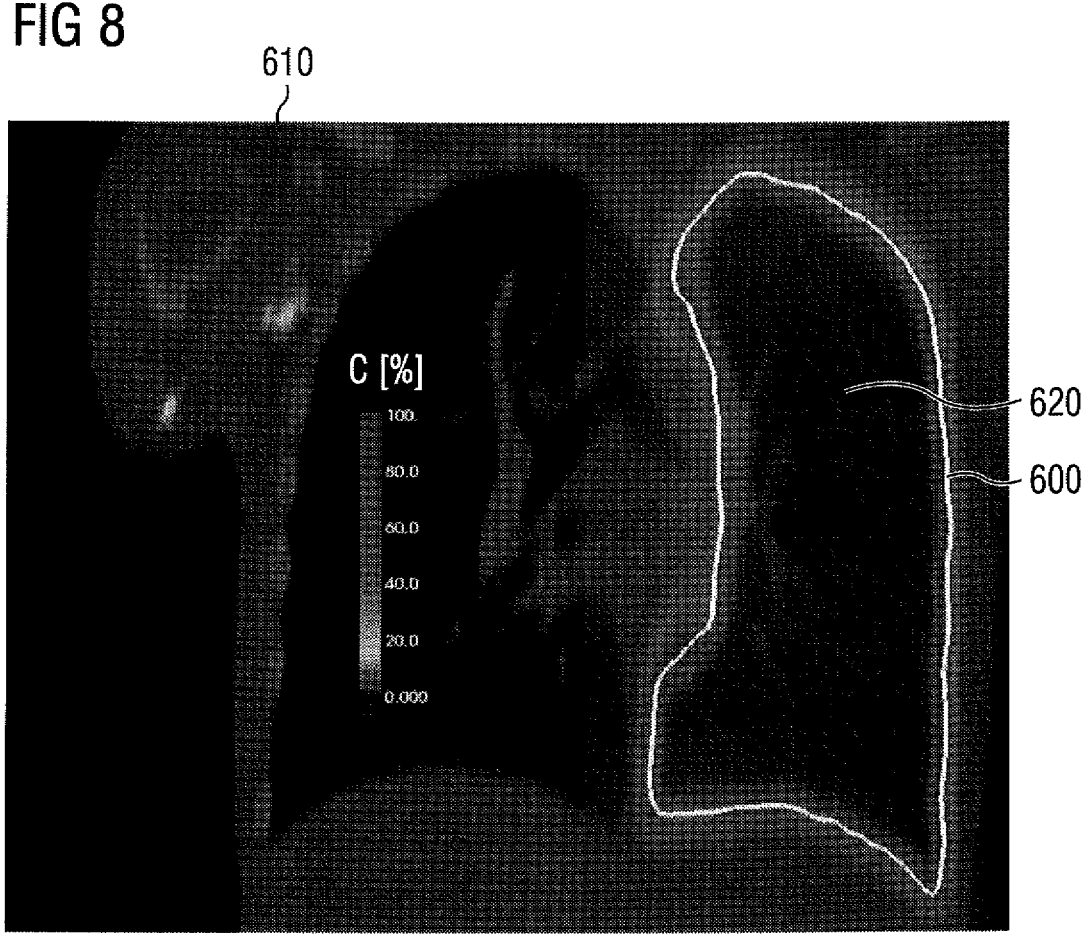
FIG. 8 illustrates confidence values determined for a manually produced segmentation contour around a lung.

FIG. 8 illustrates a further application example. FIG. 8 shows a coronal layer image of a thorax of an examination subject acquired using computed tomography. Shown in the right-hand section of the image is a lightly drawn segmentation contour of the left lung, which contour was produced manually by user input. Based on the depicted image data and the provided segmentation contour, confidence values for the segmentation contour were determined using the method illustrated in FIG. 3. For most sections of the segmentation contour, the method estimated relatively similar confidence values. The confidence values change in the region, in which the bronchial tubes enter the lung. The confidence values are lower in this region, which is indicative of a reduced reliability of the segmentation in this region. This is consistent with clinical observations. While most parts of the lung parenchyma may be traced manually with a high degree of consistency even by different users, the contours determined manually by different users in the regions neighboring the bronchial tubes may show major variations.

Thus, it has been shown for various examples that the method according to the present embodiments enables automatic determination of meaningful confidence values for a segmentation contour, using which the reliability of the segmentation may be assessed. For this purpose, the method uses the original image data and the segmentation result to be checked. The confidence values may be determined for 2-dimensional or 3-dimensional image data (e.g., medical image data). The confidence values may subsequently be utilized for achieving an automatic improvement of the segmentation. Alternatively or in addition, the user's attention may be drawn to regions of the segmentation contour, for which the segmentation accuracy is questionable, by displaying the confidence values.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for checking a segmentation of a structure in image data, the segmentation to be checked providing a segmentation region that approximates the structure imaged in the image data and is delimited by a segmentation contour, the method comprising:
   automatically determining spatially resolved characteristic values serving as an indicator of an accuracy of the segmentation of the structure on the basis of the image data; and
   automatically determining spatially resolved confidence values for a plurality of positions on the segmentation contour using the automatically determined characteristic values determined for corresponding positions,
   wherein the spatially resolved characteristic values include gradients of intensity values in the image data, in which the structure is imaged, gradients of probability values of a probability map determined using a random walker segmentation method during a segmentation of the structure in the image data in the course of the method for checking, or curvature values of probability isocontour lines in the probability map.

2. The method as claimed in claim 1, wherein the spatially resolved characteristic values are determined on the basis of the segmentation contour to be checked, and
   wherein the spatially resolved characteristic values include curvature values of the segmentation contour to be checked.

3. The method as claimed in claim 1, wherein the spatially resolved characteristic values are determined on the basis of the applied segmentation method, and
   wherein the spatially resolved characteristic values include gradients of probability values of a probability map determined using a random walker segmentation method applied during the performance of the segmentation to be checked, curvature values of probability isocontour lines in the probability map, convergence rates for different sections of the segmentation contour to be checked that occur during the performance of the segmentation using the segmentation method, or changes in values of an energy functional determined using the segmentation method with variations of the segmentation contour.

4. The method as claimed in claim 1, wherein the confidence value for a position of the plurality is determined by statistical analysis of the characteristic values that are arranged in a specific region around the position.

5. The method as claimed in claim 4, wherein the statistical analysis includes determining a simple or weighted average value or a median of the characteristic values in the determined region.

6. The method as claimed in claim 1, wherein the confidence values are determined such that higher characteristic values lead to higher confidence values.

7. The method as claimed in claim 1, wherein the segmentation contour in the image data is described by positions of pixels or voxels that lie on the segmentation contour or are intersected by the segmentation contour, a confidence value being determined for each of the pixels or each of the voxels of the segmentation contour.

8. The method as claimed in claim 1, further comprising performing a random walker segmentation method to segment the structure in the image data, probability values for the image data being determined using the random walker segmentation method,
   wherein the spatially resolved characteristic values are determined by determining gradients of the probability values.

9. The method as claimed in claim 8, wherein seed points for the random walker segmentation method are determined on the basis of the segmentation to be checked.

10. The method as claimed in claim 8, wherein performing the random walker segmentation method comprises:
    automatically determining a signed distance function that indicates distances from the segmentation contour of the segmentation to be checked;
    automatically specifying seed points inside and outside the segmentation region for a predetermined distance from the segmentation contour; and
    automatically performing the random walker segmentation method using the specified seed points.

11. The method as claimed in claim 1, wherein the segmentation to be checked is produced using a random walker segmentation method, with which probability values for the image data are determined, and
    wherein the spatially resolved characteristic values are determined by determining gradients of the probability values.

12. The method as claimed in claim 1, wherein the segmentation to be checked is produced using a random walker segmentation method, and
    wherein the spatially resolved characteristic values are determined by determining a curvature of the segmentation contour of the segmentation to be checked.

13. The method as claimed in claim 1, wherein the segmentation of the structure in the image data is continued starting from the segmentation to be checked using the determined confidence values.

14. The method as claimed in claim 1, wherein the spatially resolved characteristic values are determined on the basis of the segmentation method, and
wherein the method further comprises:
automatically modifying a parameter of the segmentation method, using which the segmentation to be checked is produced, on the basis of the determined confidence values; and
re-determining the segmentation using the modified segmentation method.

15. The method as claimed in claim 14, wherein the segmentation to be checked is produced using a random walker segmentation method, and
wherein at least a threshold value for a binary extraction of the segmentation region from a probability map is adjusted locally on the basis of the confidence values.

16. The method as claimed in claim 1, wherein the segmentation to be checked is a manual segmentation performed by user input.

17. The method as claimed in claim 1, further comprising displaying, in a spatially resolved mariner, the confidence values for the segmentation contour.

18. A device for checking a segmentation of a structure in image data, the segmentation to be checked providing a segmentation region that approximates the structure imaged in the image data and is delimited by a segmentation contour, the device comprising:
a computer unit configured to:
automatically determine, in a spatially resolved manner, characteristic values that serve as an indicator of an accuracy of the segmentation of the structure on the basis of the image data; and
automatically determine, in a spatially resolved manner, confidence values for a plurality of positions on the segmentation contour using the characteristic values determined for corresponding positions,
wherein the confidence values indicate a reliability of the segmentation to be checked at the corresponding positions, and
wherein the spatially resolved characteristic values include gradients of intensity values in the image data, in which the structure is imaged, gradients of probability values of a probability map determined using a random walker segmentation method during a segmentation of the structure in the image data in the course of the method for checking, or curvature values of probability isocontour lines in the probability map.

19. In a non-transitory computer readable medium comprising computer readable instructions that, when executed by a computer system, check a segmentation of a structure in image data, the segmentation to be checked providing a segmentation region that approximates the structure imaged in the image data and is delimited by a segmentation contour, the computer readable instructions comprising:
automatically determining characteristic values serving as an indicator of an accuracy of the segmentation of the structure for different positions, the determining being on the basis of the image data; and
automatically determining confidence values for a plurality of the different positions on the segmentation contour using the automatically determined characteristic values,
wherein the spatially resolved characteristic values include gradients of intensity values in the image data, in which the structure is imaged, gradients of probability values of a probability map determined using a random walker segmentation method during a segmentation of the structure in the image data in the course of the method for checking, or curvature values of probability isocontour lines in the probability map.

20. A computer program product comprising a non-transitory computer readable medium including a computer program that, when executed by a computer system, checks a segmentation of a structure in image data, the segmentation to be checked providing a segmentation region that approximates the structure imaged in the image data and that is delimited by a segmentation contour, the computer program including instructions comprising:
automatically determining, in a spatially resolved manner, characteristic values serving as an indicator of an accuracy of the segmentation of the structure on the basis of the image data; and
automatically determining, in a spatially resolved manner, confidence values for a plurality of positions on the segmentation contour using the automatically determined characteristic values determined for corresponding positions,
wherein the spatially resolved characteristic values include gradients of intensity values in the image data, in which the structure is imaged, gradients of probability values of a probability map determined using a random walker segmentation method during a segmentation of the structure in the image data in the course of the method for checking, or curvature values of probability isocontour lines in the probability map.

* * * * *